Aug. 15, 1967     L. T. MEKKES     3,336,062
RETAINER RING
Filed April 13, 1965

INVENTOR.
Lee T. Mekkes
BY S. C. Thorpe
ATTORNEY

United States Patent Office 3,336,062
Patented Aug. 15, 1967

3,336,062
RETAINER RING
Lee T. Mekkes, Grandville, Mich., assignor to General Motors Corporation, Detroit, Mich., a corporation of Delaware
Filed Apr. 13, 1965, Ser. No. 447,693
5 Claims. (Cl. 287—119)

ABSTRACT OF THE DISCLOSURE

An abutment for a member slidable in a bore of a second member is formed by a torsionally elastic ring of D-shaped radial cross-section seated in an internal groove in the bore, the flat side of the D normally extending out of the groove but the ring being twistable torsionally to bring said flat side flush with the bore adjacent the groove.

---

This invention relates to retainer rings for limiting relative movement between telescopically associated parts in assembly. It is particularly directed to such rings which locate in an internal annular groove within the bore of the outer of such parts and project radially inward of the bore so as to form an abutment for engagement with an end or shoulder on the inner part.

Although the invention has principal utility in such applications requiring lower retention capacity than conventional metal "snap" rings of this general type, it has advantages in ease of assembly and removal, and enables use of material for the retainer ring which is of relatively low cost and not subject to corrosion in use. The ring in accordance with the invention consists essentially of a band of nonmetallic, torsionally resilient and flexible material whose radial section is generally D-shaped with the flat side of the D facing generally inward and normally inclined to the longitudinal axis, so that a portion of the ring section adjacent one edge of such flat side projects outwardly of the ring seating groove. The torsional flexibility of the ring section, however, enables rolling of the ring within the groove to bring the flat side of the D into parallelism with the axis, and thus substantially flush with the surface of bore. While in such rolled or twisted condition, it is then possible to pass the inner of the two telescopic parts through the ring to effect their desired assembly or disassembly.

The nature of the invention, along with other objects and advantages thereof, will be more clearly understood from the following description of one illustrative embodiment thereof shown in the attached drawing, wherein.

Figure 1:
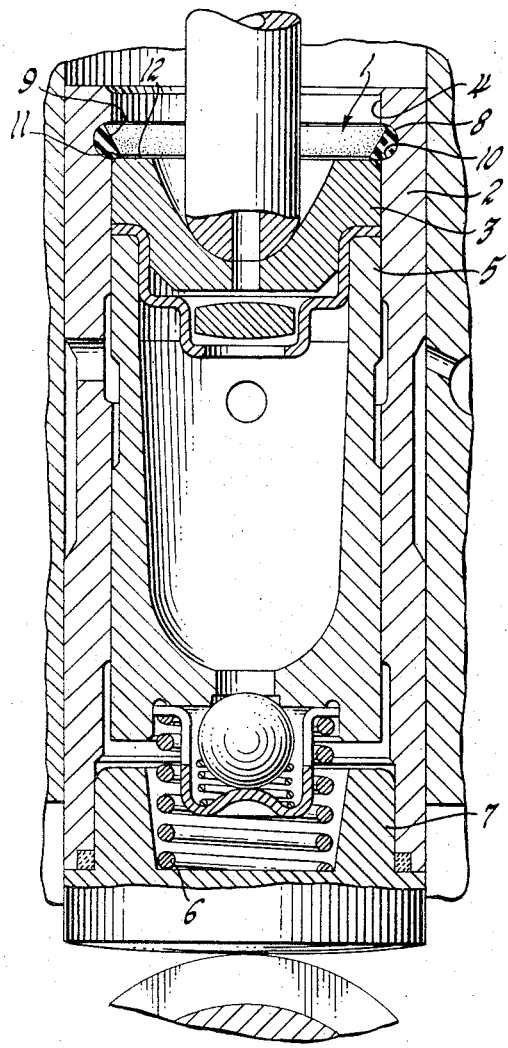
FIGURE 1 shows a retainer ring in accordance with my invention installed in a conventional hydraulic valve lifter assembly for limiting outward movement of the plunger and push rod seat from the cup-shaped lifter body.
Figure 3:
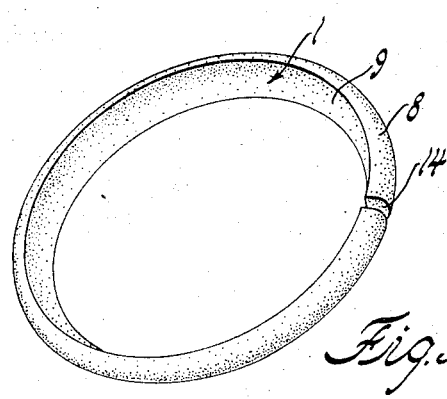
FIGURE 3 is an enlarged perspective view of the retainer ring, per se.

Referring first to FIGURES 1 and 3 of the drawing, my improved retainer ring 1 is shown in combination with two telescopically associated members 2 and 3, these being for purposes of illustration, a valve lifter body having a bore 4 and a push rod seat slidably fitting within said bore. The push rod seat is normally urged outwardly of the bore, toward the retainer ring 1, by the lifter plunger 5 and the plunger return spring 6. In the environment shown, the spring 6 reacts against the lifter foot piece 7 which is suitably fixed to the body 2. Thus, were it not for the retainer ring, the push rod seat 3, plunger 5 and spring 6 would become disassembled from the body 2.

The retainer ring is preferably constructed of suitable elastic material such as synthetic rubber which is torsionally resilient and flexible. It has a radial section of generally D-shape, i.e., including a part-circular portion 8 forming the major segment of a circle, and a flat side 9 which is normally inclined to the longitudinal axis of the ring. The bore 4 in which the ring is to be installed has an arcuate section groove 10 of sufficient radius and circumferential extent to substantially fully receive the part-circular section 8 of the ring. This ring is, of course, located longitudinally of the bore at the height therein at which it is desired to form an abutment for the inner part 3 to be retained, and the ring 1 is made of sufficient diameter to seat in the groove 10.

When thus seated in the groove in an unrestrained condition, the natural resilience of the ring material causes its flat side to assume the inclined position shown in FIGURE 1 wherein a portion 11 of the circular ring section projects outwardly of the groove into abutable engagement with the inner part 3 within the bore of the part 2. By properly orienting the ring prior to installation the ring, as shown in FIGURE 1, will preferably have its flat side 9 inclined away from the end 12 of the part 3 to be retained.

Figure 2:
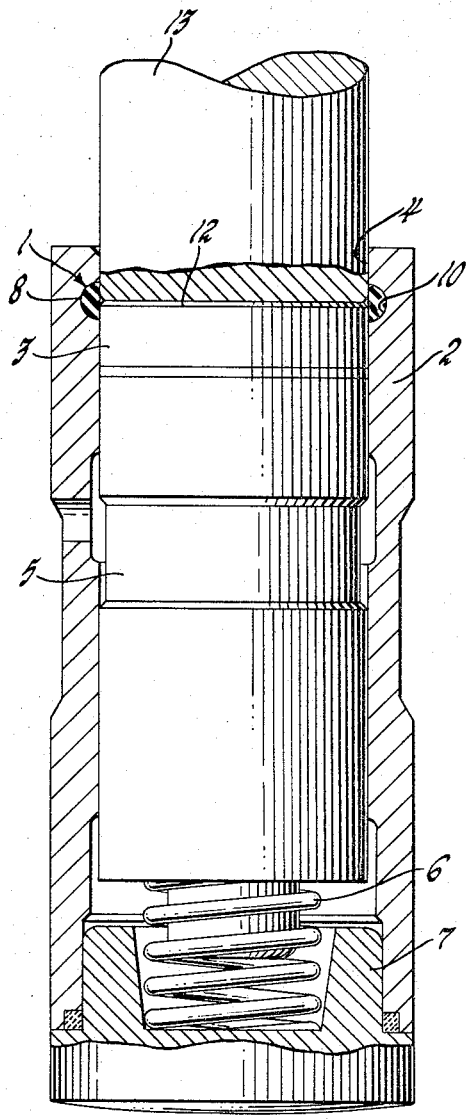
FIGURE 2 illustrates the means by which the retainer ring may be distorted from its normal free position in such lifter body when it is desired to remove the plunger and push rod seat therefrom.

When it is desired to disassemble the parts a suitable tool 13, as shown in FIGURE 2, is employed which has substantially the same outer diameter as the retained inner part 3, and by inserting such tool into the bore 4 the flat side 9 of the ring is cammed into parallelism with the ring axis. Then by withdrawing the tool 3, while allowing the part 3 to follow it (under the biasing action of the spring 6 against the plunger 5), the disassembly can be effected. Of course, in other applications where no such spring force is present, other means must be employed to shift the retained part past the deformed ring while withdrawing the tool 13.

The ring may be constructed either in continuous annular form or, as shown in FIGURE 3 with a transverse gap 14, depending upon whether the need for such a gap exists in order to avoid excessive overstressing of the ring in the course of torsionally twisting it to the condition shown in FIGURE 2. Also, where necessary to provide greater strength in the ring for higher retaining load applications, nylon, Teflon, etc., may be used in place of synthetic rubber. In such applications it may also be desirable to provide more than one such radial gap 14.

While the invention has been shown and described in its preferred form, it is appreciated that minor changes may be made therein without departing from the spirit and scope of the invention as hereinafter claimed.

I claim:

1. In combination with a first member having a bore and a second member having an end terminating within said bore, abutment means for said end within said bore including an annular ring of torsionally resilient and flexible material, said ring being D-shaped in radial cross-section and having the flat side of the D on the inner periphery of the ring and normally inclined relative to the longitudinal axis of the ring, and an annular internal groove formed in said bore, said groove being of arcuate section and of such size as to substantially fully receive all of said ring when said ring is torsionally twisted sufficiently to align its said flat side parallel to said axis, said ring being disposed in said bore with said flat side normally inclined away from said inner member end.

2. A retaining ring adapted to seat in an annular internal groove or arcuate section in the bore of a first member for limiting relative movement in one direction longitudinally of said bore between said first member and a second member disposed within said bore, said ring being of torsionally resilient and flexible material and D-shaped in radial cross-section, the flat side of the D being on the inner periphery of the ring and normally inclined to its longitudinal axis, the arcuate portion of the D being of a radius and circumferential extent to be substantially fully received within said groove when the ring is torsionally twisted sufficiently to align said flat side parallel to said axis, whereby when said ring is torsionally unrestrained a portion of said D-shaped cross-section extends inwardly toward said axis beyond the internal diameter defined by the flat side thereof in said twisted condition.

3. In combination with a pair of telescopically associated annular members, one of said members having a bore and the other having an end terminating within said bore, said bore having an internal annular groove therein of arcuate section, and an annular ring of torsionally resilient and flexible material having a D-shaped radical cross-section seated in said groove with a portion including part of the flat side of the D normally projecting therefrom into abutable relation with said end of said other member, said groove being of such size as to fully receive all of said ring, and said flat side being on the inner periphery of the ring and normally inclined relative to the longitudinal axis of the ring away from said end but rotatable by rollably twisting the ring in said groove to a position parallel with the axis of the bore and out of abutable relation with said end.

4. An annular retainer ring of torsionally resilient and flexible material having a radial section of D-shaped cross-section with the flat side of the D being on the inner periphery of the ring, said flat side being inclined to the longitudinal axis of the ring when said ring is in its normal, torsionally unrestrained condition.

5. The invention of claim 4, wherein said ring has at least one pair of circumferentially opposite facing end portions interrupting its annular continuity.

References Cited

UNITED STATES PATENTS

| | | | |
|---|---|---|---|
| 861,143 | 7/1907 | Scott | 287—135 |
| 1,464,386 | 8/1923 | Ingram | 287—135 |
| 1,475,257 | 11/1923 | Bottone | 287—119 |
| 2,458,088 | 1/1949 | Main | 285—316 |
| 3,043,614 | 7/1962 | Eichmann | 24—211 X |
| 3,134,613 | 5/1964 | Regan | 285—317 X |

FOREIGN PATENTS 730,339  5/1955  Great Britain.

CARL W. TOMLIN, *Primary Examiner.*

A. V. KUNDRAT, *Assistant Examiner.*